United States Patent [19]
Erisman

[11] Patent Number: 5,864,585
[45] Date of Patent: Jan. 26, 1999

[54] COSINE SEGMENT COMMUNICATIONS SYSTEM

[76] Inventor: David Erisman, 312 Winter Quarters, Pocomoke City, Md. 21851

[21] Appl. No.: 726,785

[22] Filed: Oct. 7, 1996

[51] Int. Cl.$^6$ .................................................. H04L 27/10
[52] U.S. Cl. ........................ 375/272; 375/334; 329/311; 332/106
[58] Field of Search .............................. 364/721, 724.08, 364/725.03; 375/303, 334, 259, 272, 269, 279, 326, 302, 271, 322, 324, 340, 342; 327/100, 129; 329/300, 311; 332/100, 106

[56] References Cited

U.S. PATENT DOCUMENTS

| | | |
|---|---|---|
| 3,713,136 | 1/1973 | Nagy, Jr. . |
| 4,435,824 | 3/1984 | Dellande et al. . |
| 4,564,823 | 1/1986 | Stahler . |
| 4,596,022 | 6/1986 | Stoner . |
| 4,745,628 | 5/1988 | McDavid et al. . |
| 4,809,205 | 2/1989 | Freeman .................................. 364/721 |
| 4,871,987 | 10/1989 | Kawase . |
| 4,897,620 | 1/1990 | Paradise . |
| 4,905,177 | 2/1990 | Weaver, Jr. et al. ..................... 364/721 |
| 4,975,699 | 12/1990 | Frey ......................................... 341/118 |
| 5,237,324 | 8/1993 | Linz et al. ............................... 341/147 |
| 5,357,544 | 10/1994 | Horner et al. . |
| 5,361,046 | 11/1994 | Kaewell, Jr. et al. . |
| 5,406,584 | 4/1995 | Erisman . |
| 5,430,764 | 7/1995 | Chren, Jr. ................................ 375/308 |
| 5,467,294 | 11/1995 | Hu et al. ................................. 364/721 |
| 5,481,230 | 1/1996 | Chang et al. . |
| 5,513,219 | 4/1996 | Ham . |

Primary Examiner—Huy D. Vu
Assistant Examiner—Jean B. Corrielus
Attorney, Agent, or Firm—Richard C. Litman

[57] ABSTRACT

A digital communication system is disclosed which is unique in that it modulates a sinusoidal carrier with a discrete cosine segment, a zero slope level segment, and combinations thereof. The discrete cosine segments may contain different time and amplitude values. The discrete cosine segments may be combined with each other or with zero slope level segments in order to effectively modulate the sinusoidal carrier. Rather than employing the use of filters for controlling instantaneous voltage changes, the present communication system forces the bit edges of the discrete cosine segments to occur at the zero slope points of a cosine wave, where no voltage changes occur. The communication system utilizes direct digital synthesis in order to create a carrier signal which closely represents sinusoidal carrier signal. The present communication system may be used in conjunction with various conventional methods such as phase-shift keying and amplitude-shift keying. A demodulator device is also disclosed for demodulating the carrier signal in order to recover the original base band signal.

11 Claims, 15 Drawing Sheets

(PRIOR ARRT)

COSINE SEGMENT COMMUNICATIONS SYSTEM

BACKGROUND OF THE INVENTION

1. Field of the Invention

The present invention relates to digital communication systems in which electrical signals are varied to create discrete symbols that can be transmitted efficiently over electrical wires, fiber optic cable, or propagated over the airwaves to convey information digitally. More particularly, the present invention pertains to a very narrow bandwidth digital data communications technique in which the electromagnetic carrier signal is created from discrete cosine segments that represent the digital data to be transmitted.

2. Description of the Prior Art

Digital modulation is well known and commonly used to transmit information over a communications channel by altering certain aspects of a carrier signal. In digital modulation, the carrier signal is altered so that discrete states are created with very little chance for ambiguity between the states. Each discrete state must be different and unique from the other discrete states in order to be reliably detected at the receiving end. The discrete states correspond to one or more binary bits of data. Accordingly, the resulting modulated carrier has improved immunity to noise when compared to similar analog modulated carriers representing continuous signal transitions with no discrete states.

Carrier signals for digital modulation are typically based on sinusoidal waveforms because such waveforms require the least amount of bandwidth. There exists three classical forms of digital sinusoidal modulation: amplitude-shift keying (ASK), frequency-shift keying (FSK), and phase-shift keying (PSK). Improvements have been made in digital sinusoidal modulation, however all of the improvements been based on the three classical techniques previously mentioned. In ASK, the amplitude of the carrier signal is varied or shifted in response to changes in the digital data. In FSK, the frequency of the carrier signal is varied or shifted in response to changes in the digital data. In PSK, the phase of the carrier signal is varied or shifted in response to changes in the digital data.

There are also certain disadvantages associated with the classical modulation techniques. For example, ASK is especially susceptible to atmospheric noise and fading. FSK requires that an associated receiver detect two discrete frequencies before the frequency can be acquired and detected. This presents delays due to of the additional time required to receive the several cycles of each frequency. PSK requires complex receiver circuitry in order to detect phase changes. Furthermore, elaborate filtering is necessary to control spurious outputs resulting from the discontinuities associated with the phase changes.

One disadvantage, however, is common to all of the classical modulation techniques and their derivative improvements. This is the use of fixed time slots for varying the characteristics of the carrier signal. When fixed time slots are used, variations in the carrier signal occur at random points along the sinusoidal waveform, thus resulting in spurious frequencies and expanding the modulation bandwidth. Complex filtering becomes necessary in order to reduce the amplitude of these spurious frequencies. As the bit rate increases, the variations in the carrier signal occur more frequently, thus posing a challenging demodulation task.

It is well known that the amount of spurious output generated by the variation of a sinusoidal waveform is dependant upon the instantaneous value of the slope of the waveform when the change occurs. Thus, a change which occurs at exactly the midpoint or highest kinetic energy point of the waveform generates the greatest amount of spurious output because the slope value is at its maximum. If the change occurs at exactly the peak of the waveform however, the least amount of spurious output is generated because the slope value is at its minimum, i.e., zero kinetic energy.

Representation of discrete states of digital data is accomplished through various base band encoding techniques. FIG. 20 illustrates various base band encoding techniques. In NRZ-Level encoding 210, digital code is produced by instantaneously shifting voltage levels at fixed bit time intervals so that two unique binary symbols are represented, a one and a zero. Thus, a one is represented by one level, while a zero is represented by the other level. The NRZ-Mark digital code 212 is produced by instantaneously shifting voltage levels at fixed bit intervals only when a one is transmitted and not changing levels when a zero is transmitted. The RZ digital code 214 is produced by instantaneously shifting voltage levels at half bit-time intervals when a one is transmitted and not changing levels when a zero is transmitted. A BI-PHASE-Level digital code 216 is produced by instantaneously shifting voltage levels at half bit-time intervals so that a one is a high level during the first half of the bit time and a zero is a high level during the second half of the bit time. The NRZ-4Level digital code 218 is produced by shifting voltage levels instantaneously after two bit-time intervals. A one-one is transmitted by the top level, a one-zero is transmitted by the next lower level, a zero-one is transmitted by the next lower level, and a zero-zero is transmitted by the bottom level. By encoding two bit times into one symbol, NRZ-4Level encoding reduces the effective transitioning rate in half. Similarly, three bit times could be encoded into NRZ-8Level encoding to reduce the transitioning rate by one third. Multi-level encoding suffers from a drawback in that it necessitates a more complex receiver to detect and recover the transmitted symbol.

The prior art creates transitions at fixed bit times when encoding digital symbols. These transitions occur at the bit edges and remain steady until the next bit edge, thus requiring the transmission of a step function or rectangular pulse. The rectangular pulse or step function generates spurious energy components at frequencies from zero to infinity. Consequently, frequency multiplexing of data over a communications channel cannot be performed unless the instantaneous voltage transitions of the rectangular pulse are filtered to remove unwanted energy components throughout the frequency spectrum. The rectangular pulse and its corresponding bandwidth are shown in FIG. 21.

As an example, consider data transmitted at 1000 bits/second. The bit time T would be 1/1000 of a second, or 1 millisecond. The first frequency null would occur at 1/T or 1000 Hz and energy components would extend from zero Hz to infinity. When the rectangular pulse is used to modulate a sinusoidal carrier, the negative frequency spectrum would also be translated up in frequency and the null to null bandwidth would be 2/T or 2000 Hz. However, only the main energy lobe is absolutely necessary to recover the transmitted data. Furthermore, it is desirable to reduce the modulation bandwidth by eliminating frequency energy outside this primary lobe.

In order to transmit the maximum amount of data over a given digital communications channel, a small bandwidth and high bit rates are required. For example, more data can be transmitted over a frequency multiplexed communications channel, such as those used in satellite links, when data communication techniques are used which have narrow bandwidth requirements per carrier signal while still providing high data rates.

Much development work has gone into ways of minimizing the bandwidth of the rectangular pulse. In the prior art, the instantaneous transitions at the bit edges are smoothed by passing the rectangular pulse through filters. While the filtering process removes many of the unwanted frequencies outside of the main modulation lobe, it also removes some of the energy which helps in the symbol recovery process. Thus, a delicate balancing act must be made in choosing a filter suitable for reducing the bandwidth while not seriously degrading the modulation information contained within the symbol. It has been shown by Nyquist and others that the band limited rectangular pulse has an ideal shape after filtering which is called the sin x/x or sinc pulse.

A filtered rectangular pulse which closely approximates the ideal sinc pulse shape is commonly used to modulate a high frequency sinusoidal carrier, thus producing an upconverted frequency multiplexed communication channel which can transmit numerous messages simultaneously. Each digitally encoded base band signal is subsequently modulated with a carefully chosen local oscillator frequency in order to pack the greatest number of carrier signals within a given communications channel.

Recovery of individual carrier signals is accomplished through the use of a carefully created local oscillator capable of downconverting the carrier signal to the original digitally encoded base band signal. Due to the pulse filtering during the modulation process, the received base band signal has an "eye pattern" associated with it. This eye pattern is the result of the vertical edges of the rectangular pulse being filtered and the shape of the "eye" opening is based on the sinc pulse shape.

Conventional demodulation of the data in the two symbol case is accomplished by using a zero voltage reference. A measurement is made at the center of the bit time in order to determine whether the received symbol is above or below this zero voltage level. It is important to base the decision of which bit was received precisely at the midpoint of the bit time because the least amount of ambiguity exists between symbols at the midpoint of the bit time. Furthermore, the decision of which symbol is received is complicated by interference and noise that is present to some degree in all communications channels. The interference and noise causes the eye opening to close, thus making it critical to choose the optimum point for symbol decision making.

Further reductions in the bandwidth can be gained when more than two symbols are utilized. The number of symbols increases as a power of 2. For example, 2, 4, 8, 16, 32, 64, 128, 256, 512, and 1024 symbols are used in modern communications systems. To achieve a large number of unique and distinctive symbols, changes in carrier phase and amplitude are typically used. To go from 2 to 4 symbols gives a reduction of 2 in bandwidth. Eight symbols reduce bandwidth by one third, sixteen symbols reduces bandwidth by one fourth and so on. The penalty for increasing the number of symbols is the increased difficulty in determining which symbol was actually received.

When the binary case of two symbols is used, there is only one voltage reference needed to determine if the eye pattern is above or below the reference. However, when many symbols are used to reduce bandwidth, a corresponding increase in symbol amplitude and phase references are needed. This is further complicated by the fact that interference and noise are always present in the channel, resulting in a greater possibility of making an incorrect symbol decision when an increased number of symbols are used.

The prior art discloses various digital modulation and symbol encoding techniques. For example, U.S. Pat. No. 4,435,824 issued on Mar. 6, 1984 to Dellande et al. discloses a communication system which generates an output signal of a selected primary frequency having digital data bits serially modulated thereon. The system utilizes a hybrid differential phase-shift keyed (DPSK) modulation. The improved DPSK modulation is frequency modulation of a phase encoded signal. A controller is used to control a frequency generator means which is used to shift the frequency of the output signal between primary and secondary frequencies. The controller and frequency generator means provide a modulated output signal which is D.C. balanced bit by bit and has substantially reduced harmonic energy.

U.S. Pat. No. 4,564,823 issued on Jan. 14, 1986 to Stahler discloses a modulation system wherein a carrier signal is modulated by an input signal having a variable amplitude. The amplitude of the input signal is sampled every predetermined fractional cycle of the modulated signal. The carrier signal is modulated in response to the sampled amplitude of the input signal. This provides a modulated signal having an amplitude and duration which are inversely proportional to each other, but related to the sampled amplitude of the input signal, for each predetermined fractional cycle. The signal is subsequently demodulated by zero-crossing detection, peak-amplitude detection, or a combination of both. The system is self-clocking, does not produce discontinuous phase or amplitude changes, and does not introduce DC components.

U.S. Pat. No. 4,596,022 issued on Jun. 17, 1986 to Stoner discloses a system for communicating digital data over a limited bandwidth transmission link. The system utilizes modulator means for receiving an input digital signal and generating a corresponding frequency shift keyed signal having high-frequency and low-frequency signals with in-phase signal transitions at frequency shifts. Demodulator means are provided for receiving and demodulating the frequency shift signal in order to generate an output digital signal corresponding to the input digital signal. The demodulator means includes a zero-crossing detector in order to recover the frequency-shift keyed signal received. The system includes a transition detector for detecting transitions in the binary logic state on an input digital signal and generating a transition indicator signal in response thereto. A frequency-shift key having an oscillator capable of generating high and low frequency signals is used to provide substantially in-phase signal shifts.

U.S. Pat. No. 4,745,628 issued on May 17, 1988 to McDavid et al. discloses a symbol generator for phase modulated systems. The symbol modulator produces a filtered analog waveform for use in phase modulating a carrier. The symbol generator includes a memory for storing digital representations of analog waveform segments at predetermined addressable locations. Each segment corresponds to the cross-correlation of a predetermined filter function with a predetermined number of data bits in the data stream. The data stream is converted to an address for the memory to output a digital value to a digital to analog converter. The output of the digital to analog converter includes an in-phase and quadrature-phase components which are directed to a sample and hold circuit for generating the analog signals. The waveform segments are then sequentially assembled and directed to a vector modulator.

U.S. Pat. No. 4,871,987 issued on Oct. 3, 1989 to Kawase discloses a binary signal modulator having a circuitry for sampling a binary signal at a predetermined sampling frequency. A modulating circuit responsive to the sampled binary signal is used for generating a modulated signal whose rising and decaying timings are respectively determined by the start end times of the binary signal. The rising and decaying timings of the modulated signal are defined as predetermined functions.

U.S. Pat. No. 4,897,620 issued on Jan. 30, 1990 to Paradise discloses a continuous phase shift modulation system with improved spectrum control. The inventive method includes the step of determining, in advance, whether successive pulses are to have the same or different polarities for each of the in-phase and quadrature components. If successive components are to have the same polarity, then a continuous transition modulation signal between the successive pulses is provided in place of adjacent portions of the successive half-cosine pulses. The modulation of the other component is adjusted during the time of the continuous modulation signal so as to maintain a desirable constant amplitude characteristic.

U.S. Pat. No. 5,361,046 issued on Nov. 1, 1994 to Kaewell, Jr. et al. discloses a modulator capable of providing a fractional sample or symbol time. The modulator employs a decimation counter responsive to a clock having a frequency of M/N * symbol clock, where M is an interpolation factor and N is a decimation factor. The modulator uses this frequency to generate a data symbol clock to select frequency shift key (FSK) symbols from a sampled data array. A multiplier receives and multiplies the FSK symbols by a weighing factor which is determined by the decimation counter. The modulator allows digital modulations which consist of a non-integer number of samples per symbol time to be synthesized in an efficient manner. The modulator is also capable of producing fractional sample and symbol modulations in order to allow support of modulations with various symbol rates by hardware platforms which contain fixed digital to analog sampling clocks.

U.S. Pat. No. 5,406,584 issued on Apr. 11, 1995 to Erisman discloses a time shift keying digital communication system. The system utilizes a digital modulation technique which is unique in that fixed time slots are not used to vary the characteristics of the carrier signal. Instead, variations in the time slots are used to transfer the digital information. The modulation is created by synthesizing a carrier waveform capable of varying the time it takes for each peak to occur. The peaks of the carrier signal are tightly controlled to occur at exact discrete time slots corresponding to the base band digital signal.

U.S. Pat. No. 5,481,230 issued on Jan. 2, 1996 to Chang et al. discloses a phase modulator circuit and a method for generating an output signal having individually positionable edges. The phase modulator includes a programmable pulse generator for producing an output signal and a control value source for delivering a sequence of control values to the generator. The control values determine the time between successive output pulses. Succeeding control values are provided in response to the edges of the output signal and each next control value in the sequence is made available to the programmable pulse generator within the time between successive edges of the output.

U.S. Pat. No. 5,513,219 issued on Apr. 30, 1996 to Ham discloses a method and apparatus for transmitting information at a high rate by using an undermodulated frequency shift keyed signal. The transmission rate is independent of the data content and the system requires no zero crossing detectors. The apparatus also includes a demodulator which combines non-linear processing circuitry with a conventional demodulator.

None of the above inventions and patents, taken either singly or in combination, is seen to describe the instant invention as claimed.

SUMMARY OF THE INVENTION

Accordingly, it is a principal object of the invention to provide a method of digitally creating a sinusoidal carrier by utilizing discrete cosine segments which can be added together or added with zero slope level segments.

It is another object of the invention to control the instantaneous voltage changes occurring at the bit edges without the use of filters.

It is yet another object of the invention minimize the amount of spurious output associated with the digital modulation of a sinusoidal carrier.

It is a further object of the invention to provide a method of demodulating digital data which has been modulated by cosine segment modulation (CSM).

Still another object of the invention is to provide a narrow bandwidth communication system which utilizes a carrier signal constructed from cosine segments.

It is an object of the invention to provide improved elements and arrangements thereof in an apparatus for the purposes described which is inexpensive, dependable and fully effective in accomplishing its intended purposes.

In accordance with the objects of the invention, a method is provided for digitally modulating a sinusoidal carrier. The method utilizes direct digital synthesis techniques to create discrete cosine segments. The discrete cosine segments may contain different time or amplitude values and can be combined with other discrete cosine segments or zero slope level segment to modulate the sinusoidal carrier. A table of cosine phase amplitude values is first created using direct digital synthesis techniques and subsequently stored in ROM. A plurality of digital data blocks are then transmitted to an associated receiver and modulated. The modulation is performed such that the bit edges of each of the digital data blocks occur at the peak amplitude points where no voltage step changes take place. The modulated signal is then passed through a digital to analog converter, thereby producing an analog waveform. A microprocessor and a phase accumulator may be utilized to accurately control reception and modulation of the digital data blocks. In preferred embodiments of the invention, the output of the digital to analog converter may be filtered in order to remove sampling artifacts and produce a low distortion waveform.

In accordance with another object of the invention, a method is provided for demodulating data which has been modulated by cosine segment modulation. The data received is in the form of a carrier signal which is composed of carrier segments. The data is filtered in order to remove unwanted noise. The carrier segments of the cosine segment modulated data may then be recovered by detecting the presence or absence of cosine segments within a predetermined bit time or symbol duration. In preferred embodiments of the invention, the frequency of the carrier symbol is downconverted to the lowest possible value and filtered.

In accordance with another object of the invention, a cosine segment communication system is provided. The system includes means for receiving a plurality of digital data blocks. The digital data blocks are received in a sequential manner. Furthermore, each digital data block has a discrete value associated therewith which is selected from a predetermined number of possibly assigned discrete values. In certain preferred embodiments of the invention, the predetermined number of possibly assigned discrete values is two. Thus, each block of digital data is a binary digit. The system also includes means for modulating the data blocks in order to construct a carrier signal having carrier segments of predetermined shapes. The predetermined shapes are selected from a predetermined set of shapes. The set of shapes may include cosine segments, zero slope level segments, or a combination of both. The terminal ends of each carrier segment has a slope equal to zero. In preferred embodiments of the invention, the cosine segments are pi radians in length, so that they begin with a zero slope and terminate with a zero slope.

The system monitors the completion of each successive carrier segment being used to construct the carrier signal and a controller produces a control signal which indicates the correct carrier segment to be used. The controller accomplishes this task by examining the discrete value associated with the incoming digital data blocks and determining which carrier segment is representative of the digital data block being examined. It is preferred that the system further include means for transmitting the resulting carrier signal to a remote location. Furthermore, the remote location should be capable of receiving the carrier and demodulating it so that the base band digital signal is recovered.

These and other objects of the present invention will become readily apparent upon further review of the following specification and drawings.

BRIEF DESCRIPTION OF THE DRAWINGS

FIG. 11B is a frequency plot of the same data modulated with NRZ modulation.

Similar reference characters denote corresponding features consistently throughout the attached drawings.

DETAILED DESCRIPTION OF THE PREFERRED EMBODIMENTS

Figure 1:
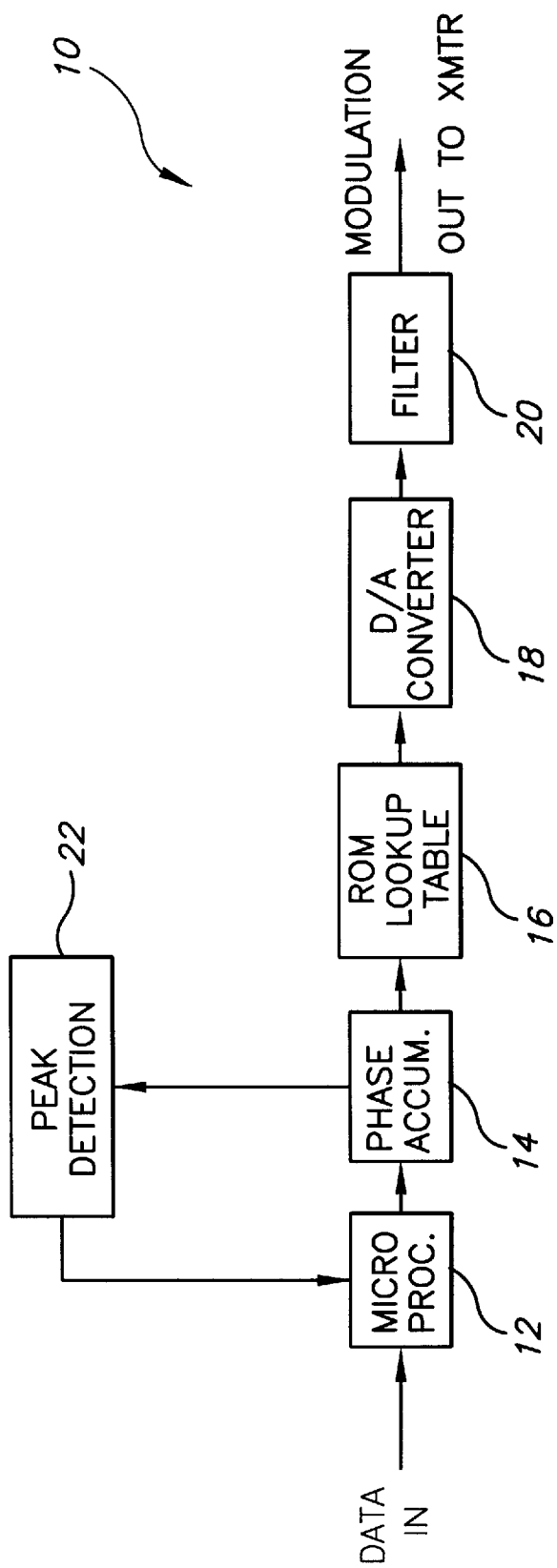
FIG. 1 is a block diagram of a modulator circuit for carrying out the cosine segment modulation technique of the present invention.

With reference to the drawings and initially to FIG. 1, there is shown a block diagram 10 of a modulator circuit for carrying out the cosine segment modulation technique of the present invention. The system includes means for receiving a plurality of digital data blocks, means for modulating the data blocks, and means for determining the completion of successive segments of the carrier signal being constructed.

The digital data blocks are received in a sequential manner and further include a discrete value associated therewith which is selected from a predetermined number of possibly assigned discrete values. In preferred embodiments of the invention, the predetermined number of possibly assigned discrete values is two, such that each block of digital data is representative of a binary digit. The digital data is received by a controller 12 which includes two inputs and one output. The output of the controller 12 is coupled to the means for modulating the digital data received.

The means for modulating the digital data includes a phase accumulator 14, a ROM look-up table 16, a digital to analog converter 18, and a peak detection circuit 22. The input of the phase accumulator 14 is directly coupled to the output of the controller 12. The phase accumulator 14 includes two outputs, one coupled to the input of the ROM look-up table 16 and another coupled to the input of the peak detection circuit 22. The output of the peak detection circuit 22 is coupled to the second input of the controller 12.

Figure 6:
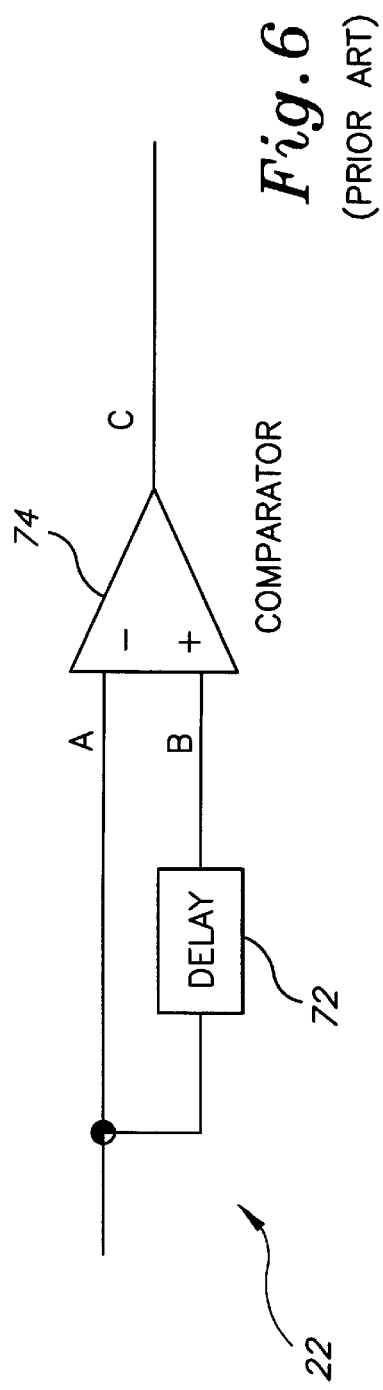
FIG. 6 is schematic of a peak detector circuitry used in the present invention.

With continued reference to FIG. 1 and particular reference to FIG. 6, the peak detection circuit 22 is seen to include an operational amplifier used as a comparator circuit. The signal from the phase accumulator 14 is coupled to the inverted input of the operational amplifier. The signal from the phase accumulator 14 is also directed through a delay circuit and the resulting output is coupled to the normal input of the operational amplifier. When the normal input of the operational amplifier is greater than that of the inverted input, the output is pinned to the normal power supply voltage level. If the inverted input of the operational amplifier is greater than that of the normal input, then the output is pinned to the inverted power supply voltage level. The time difference between comparator changes is examined by a time shift detector (not shown) in order to demodulate the data.

Turning back to FIG. 1, the phase accumulator 14 receives a succession of control signals from the output of the controller 12. The phase accumulator 14 then uses these control signals to generate a succession of phase address locations. The phase addresses correspond to successive addresses in the ROM look-up table 16. The addresses in the ROM look-up table 16 contain amplitude coefficients for predetermined shapes. The amplitude coefficients are subsequently directed to the input of the digital to analog converter 18 in order to produce an accurate sinusoidal waveform. It is also possible to direct the output of the digital to analog converter 18 to a filter 20 in order to remove sampling noise and interference which is outside the desired bandwidth.

The predetermined shapes stored in the ROM look-up table 16 are selected from a predetermined set of shapes. The set of shapes may include cosine segments, zero slope level segments, or a combination of both. The terminal ends of each segment has a slope which is equal to zero. In preferred embodiments of the invention, the cosine segments are pi radians in length, so that they begin with a zero slope and terminate with a zero slope.

The system monitors the completion of each successive carrier segment being used to construct the carrier signal and the controller 12 produces a control signal which indicates the correct carrier segment to be used. The control signal is a numerical value which indicates to the phase accumulator 14 which starting and ending addresses to use in order to create the next symbol. Thus, the phase accumulator 14 will access the symbol amplitude coefficients which are sequentially located in the ROM look-up table 16 in accordance with the address values produced by the controller 12. The controller 12 accomplishes this task by examining the discrete value associated with each of the incoming digital data blocks and determining which carrier segment is representative of the current digital data block being examined. The controller 12 can detect when the zero slope points occur by monitoring the signal from the peak detection circuit 22.

The peak detection circuit 22 monitors the address signals from the phase accumulator 14 in order to detect the peaks of the sinusoidal carrier which correspond to the addresses containing the largest positive and negative cosine wave phase amplitude coefficients stored within the ROM look-up table 16. Whenever the address signal indicates that the address of the positive or negative peak is being accessed from the ROM look-up table 16, the peak detection circuit 22 will then indicate to the controller 12 that the end of a carrier segment has been reached via a signal directed to the second input of the controller 12. If more than 1 pi radians is desired to be contained within the digital symbol, the number of peak detections can be used to control the number of pi radian cosine segments contained within the symbol.

When the address containing a zero slope such as a cosine peak or symbol edge is detected, the microprocessor can send a new signal to the Direct Digital Synthesizer (DDS), thereby causing a new symbol table to be accessed. This is accomplished by addressing a different section of ROM or by varying the access time between each successive phase amplitude coefficient in that symbol. For a given clock cycle, the more phase amplitude coefficients in the table to define the cosine segment, the lower the effective carrier frequency will be. Conversely, for a given number of phase amplitude coefficients representing a cosine segment, the slower the clock cycle for addressing the ROM look-up table 16, the lower the effective carrier frequency will be. Repeating the peak positive or negative cosine phase amplitude coefficients for multiple clock times will produce zero slope segments that can provide time or phase shifts unique to that symbol.

For example, a length of time T0 may be used to indicate that a digital data block has a value of one for a carrier segment and a length of time T1 may be used to indicate that a digital data block has a value of zero. Direct digital synthesis can be used to produce cosine segments and zero slope level segments to produce a sinusoidal carrier wave with a high degree of accuracy at frequencies only limited by clock speed and current digital technology.

Consider the production of a bit rate of 1 Mbits/sec using 20 pi radian cosine segments, or 10 cycles per symbol, with a carrier frequency of approximately 10 MHz being utilized. The system clock of the DDS is 100 MHz and a one is represented by 10 cycles, or 20 cosine segments, within a symbol time of 1 microseconds, while 10 cycles, or 20 cosine segments, within a symbol time of 0.95 microseconds represents a zero. There would be 100 phase amplitude coefficients accessed from the ROM look-up table 16 for every carrier segment representing a one. There would be 95 phase amplitude coefficients accessed from the ROM look-up table 16 for every carrier segment representing a zero.

If the first block of digital data is to be a one (1) followed by a zero (0), followed by another one (1), and then followed by another zero (0), then the first and third carrier segments would have 100 phase amplitude coefficients located within them, while the second and fourth carrier segments would have 95 phase amplitude coefficients located within them. The effective data rate in this case would be 1.02564 Mbits/sec and would vary somewhat depending on the data sequence being transmitted.

The controller 12 would send a signal having a first value in order to produce a symbol with 20 pi radians in 10 microseconds for the first sinusoidal carrier segment. When the peak detection circuit 22 indicates that the bit edge or symbol endpoint has arrived, the controller 12 will send a signal having a second value in order to produce a symbol with 20 pi radians in 9.5 microseconds for the second sinusoidal carrier segment. The process continues for each carrier segment, thereby producing modulation by precisely timing the creation of the cosine segments of the carrier signal.

In the binary case of CSM where two discrete time slots would represent 1 bit of data as set forth above, the sinusoidal carrier would change its modulation parameters exactly at the zero slope point after ten cosine cycles and time would be the varied parameter. As in other forms of digital modulation, even more efficiency could be achieved by using more than two distinct carrier states. CSM could incorporate amplitude changes along with phase or time changes in order to provide even greater bandwidth efficiencies.

The frequency of electromagnetic waves is often measured in radians per second, where one thousand Hz is equivalent to two thousand pi radians per second. The positive peak to negative peak distance of a cosine wave is 1 pi radians. Thus, two pi radians would be one complete cycle, i.e. the distance from one positive peak to another positive peak or one negative peak to another negative peak. If the slope of a cosine wave is plotted, the slope would transition from zero at the signal peaks to a maximum value at the zero voltage crossing point. The higher the frequency of the cosine wave, the greater the slope value will be at the zero voltage crossing level. However, even if the frequency of the cosine wave approaches infinity, the slope values always transition to zero twice per cosine cycle.

By utilizing the special case of the cosine wave where the slope equals zero, a precisely formed digital symbol can be created that can greatly improve both the bit rate and the bandwidth required. By adding or concatenating the cosine segments together, a sinusoidal carrier can be produced which smoothly transitions between discrete phase, frequency, or time values so that a very narrow bandwidth is produced and filtering requirements are greatly reduced or become unnecessary. By precisely matching the zero slope points of the cosine segments of the carrier to the rectangular edges that define a bit time, both the bit rate and the bandwidth can be greatly improved over conventional modulation techniques.

Figure 2A:
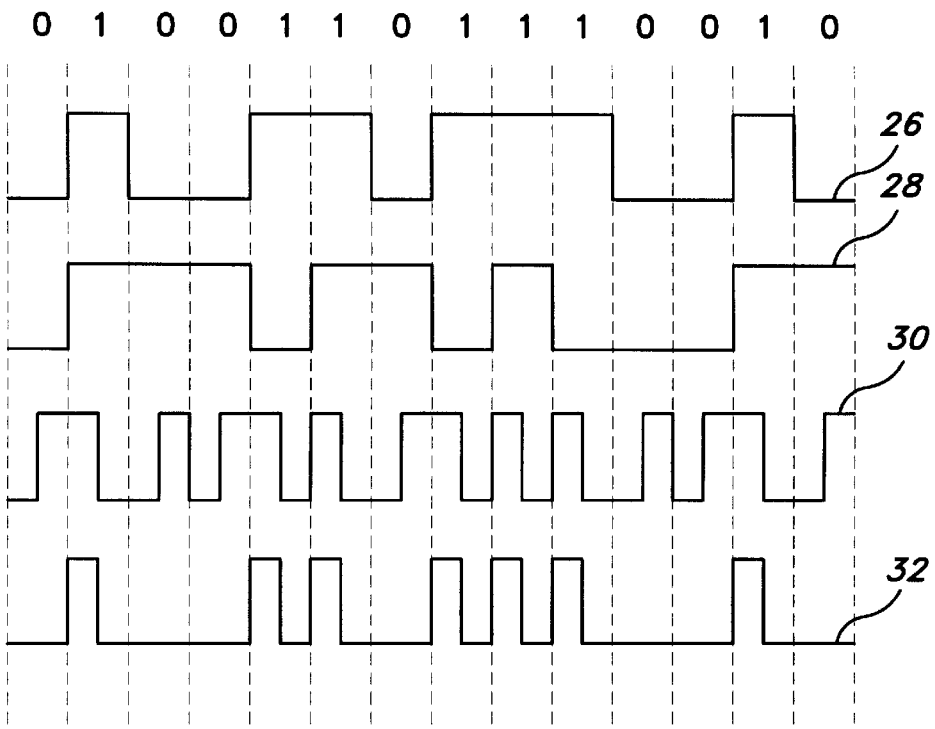
FIG. 2A is a diagram of data modulated by various methods of the prior art.
Figure 2B:
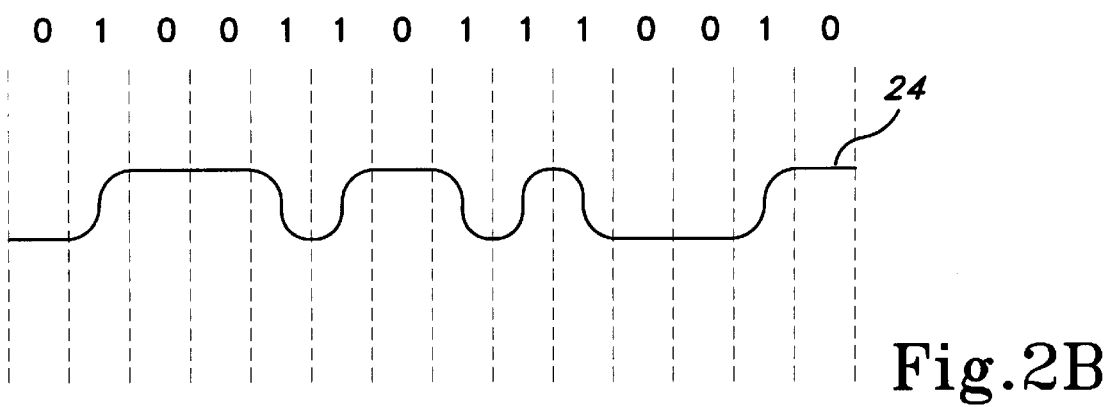
FIG. 2B is a diagram of the same data modulated using cosine segment modulation according to the present invention.

If a one pi radian cosine segment is used to represent one symbol and no level change is used for the other symbol, a new digital encoding technique called Discrete Cosine Segment-Mark modulation can be achieved. FIG. 2A and FIG. 2B comparatively illustrate discrete cosine segment modulation and various modulation techniques which are well known in the prior art. Symbol 24 represents discrete cosine segment modulation, while symbols 26, 28, 30, and 32 respectively represent NRZ-Level, NRZ-Mark, Bi-Phase-Level (Manchester), and RZ modulation.

Figure 2C:
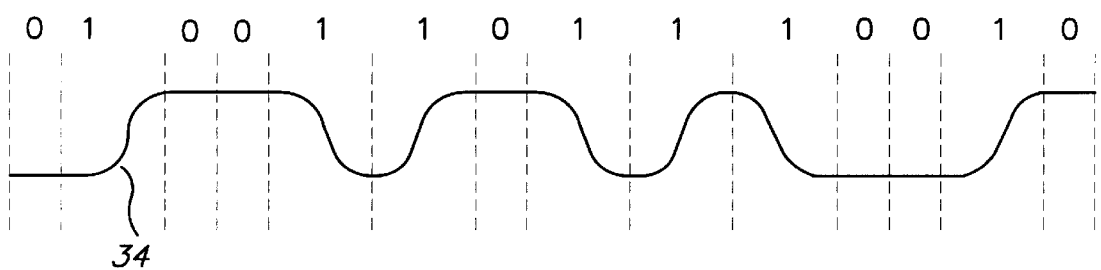
FIG. 2C is a diagram of the same data modulated using time-shift keyed cosine segment modulation.

If the principle of Time-Shift Keying is employed, the bit times do not have to be equal. This means that one symbol time is different from the other and this effect can be used to reduce the bandwidth needed to transmit the digital data. This form of digital modulation I call Time-Shifted Cosine Segment modulation. FIG. 2C illustrates symbol 34 which results from Time-Shifted Cosine Segment modulation of the same data used in FIG. 2A. Thus, by reducing the bit time for the symbol that contains no slope change, the modulated bandwidth can be reduced significantly. This reduction in bandwidth is achieved while using only two symbols. Since conventional bandwidth reduction methods require additional symbols, this means the complexity of the demodulation process is greatly reduced since only two symbols need to be decoded.

The modulated carrier signal must subsequently be transmitted to a remote location. Furthermore, the remote location should be capable of receiving the carrier and demodulating it so that the digital base band information is recovered. Demodulation of digitally encoded cosine segment data requires techniques which differ from conventional demodulation because the eye pattern which is common to conventional demodulation is not necessarily produced by cosine segment modulation. Conventional modulation requires filtering of the symbol because the bit edges occur at the voltage transition points and must be filtered to the zero volt threshold in order to remove spurious outputs. The voltage amplitude of the symbol must be detected at the mid point of the symbol. For cosine segment modulation however, the highest voltage amplitude occurs at the bit edges and the midpoint of the symbol is where the zero voltage threshold is crossed. Accordingly, the relative voltage amplitude is unnecessary for demodulation of the symbol when cosine segment modulation is used; only the occurrence of a zero voltage crossing needs to be detected.

Thus, demodulation of the symbol has changed from being an amplitude sensitive process to one of significantly reduced sensitivity regarding amplitude disturbances from noise and interference.

In conventional demodulation of two unique symbols, symbol one would be detectable if it passes above the positive voltage threshold at the mid point of the bit time. Symbol two would be detectable if it passes below the negative threshold at the mid point of the bit time. Now consider cosine segment demodulation for two unique symbols where symbol one is represented by a cosine segment of pi radians while symbol two is represented by a zero slope level segment. Both symbols have an equal bit time. Symbol one would be detectable if it passes through the zero voltage threshold at the midpoint of the bit time. Symbol two would be detectable if it does not pass through the zero voltage threshold at any point during the bit time.

Consider now, time-shifted cosine segment demodulation for two unique symbols where symbol one is represented by a cosine segment of pi radians and symbol two is represented by a zero slope level segment combined with a cosine segment of pi radians. Symbol two is represented in a bit time which is greater than that of symbol one. Symbol one would be detectable if it passes through the zero voltage threshold at the midpoint of the bit time, which is unique for each symbol. Symbol two would be detectable if it does not pass through the zero voltage threshold at the midpoint of the bit time. Each symbol is therefore detected by measuring the elapsed time from the previous symbol's zero voltage crossing until the next zero voltage crossing occurs. A time threshold is set between these two bit times and a zero crossing before this time threshold corresponds to symbol one and a zero crossing after this time threshold corresponds to symbol two.

Figure 3:
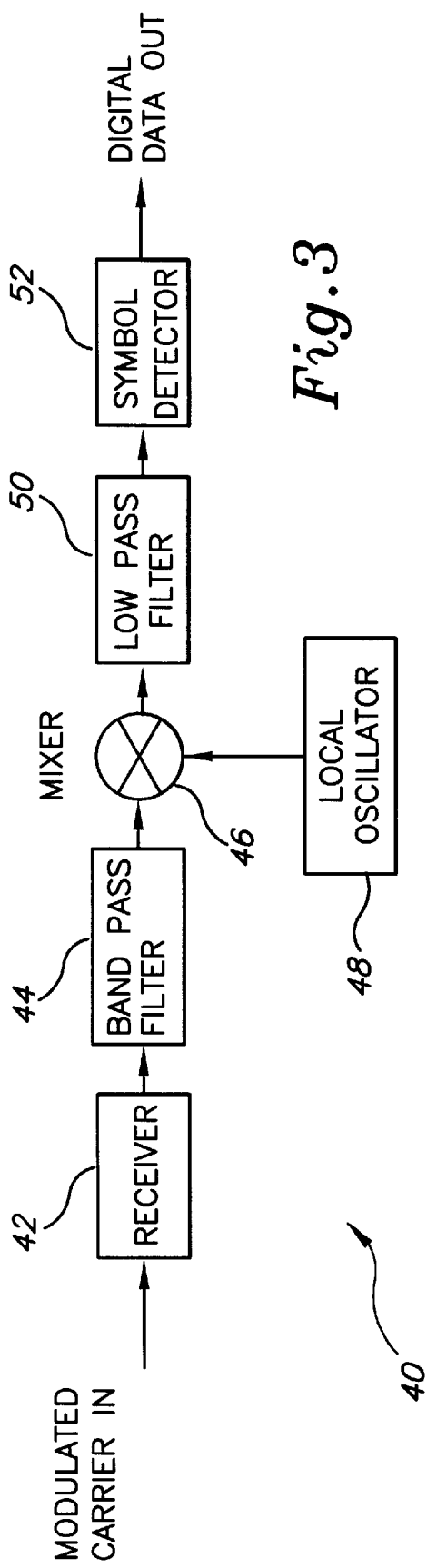
FIG. 3 is a block diagram of a demodulator circuit of the present invention.

FIG. 3 illustrates a demodulator circuit 40 in accordance with the present invention. The demodulator circuit includes a receiver 42, a first filter 44, a mixer 46, an oscillator 48, a second filter 50, and a symbol detector 52. The receiver 42 receives the modulated digital signal and directs it to the first filter 44, which is a bandpass filter. The bandpass filter 44 reduces noise and interference which is outside of the bandwidth of the two carrier segments and directs the resulting signal to the mixer 46. The mixer 46 includes a first and second input for receiving signals from the bandpass filter 44 and the oscillator 48. The oscillator 48 is set to the same frequency as one of the carrier segments. The mixer 46 is used to downconvert the symbol frequency to the lowest possible value by producing the sum and difference frequencies. Thus, carrier segments having the same frequency as the local oscillator 48 will have a beat frequency of 0 Hz. The other carrier segment will have a beat frequency equal to the frequency difference between the two carrier segments. The output of the mixer 46 is passed through a low pass filter in order to produce cosine segment encoded data. A symbol detector 52 is then used to determine the presence or absence of cosine segments within a symbol time.

Figure 4:
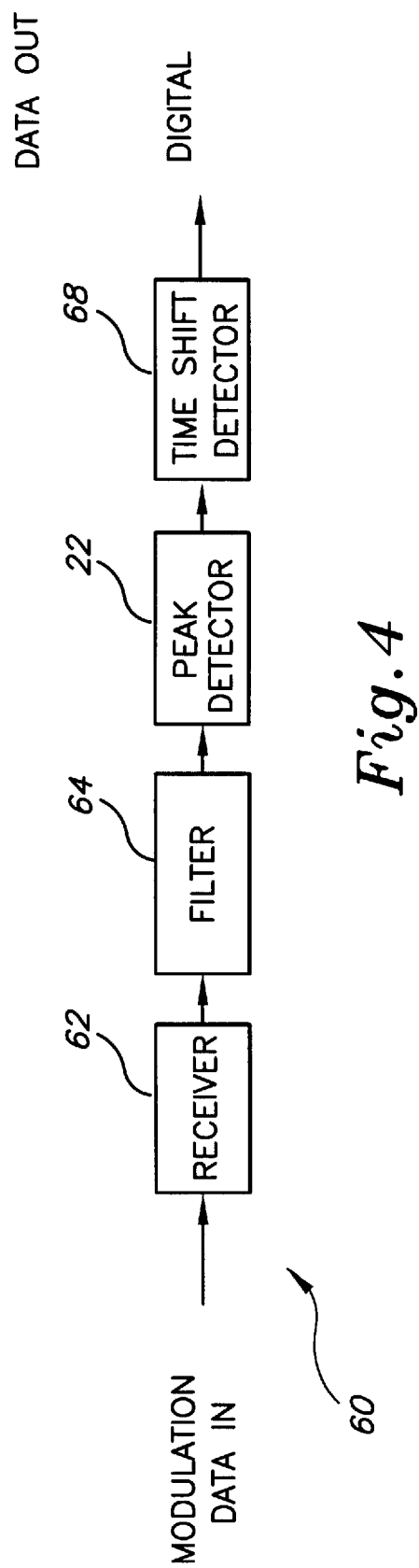
FIG. 4 is a block diagram of a demodulator circuit for use with time-shift keyed data which has been modulated using the cosine segment modulation technique of the present invention.

FIG. 4 illustrates a block diagram of the demodulator circuit 60 for use with time-shift keyed CSM data. The demodulator circuit includes a receiver 62, a filter 64, a peak detector 22, and a time shift detector 68. The carrier signal is received by the receiver 62 and directed to the filter 64 in order to remove noise and interference which is outside of the bandwidth of the two carrier segments and directs the resulting signal to the peak detector 22. The peak detector 22 processes the signal as previously described and directs the output to the time shift detector 68. The time shift detector 68 includes a microprocessor in order to analyze the incoming signal and recover the base band digital data.

Figure 5:
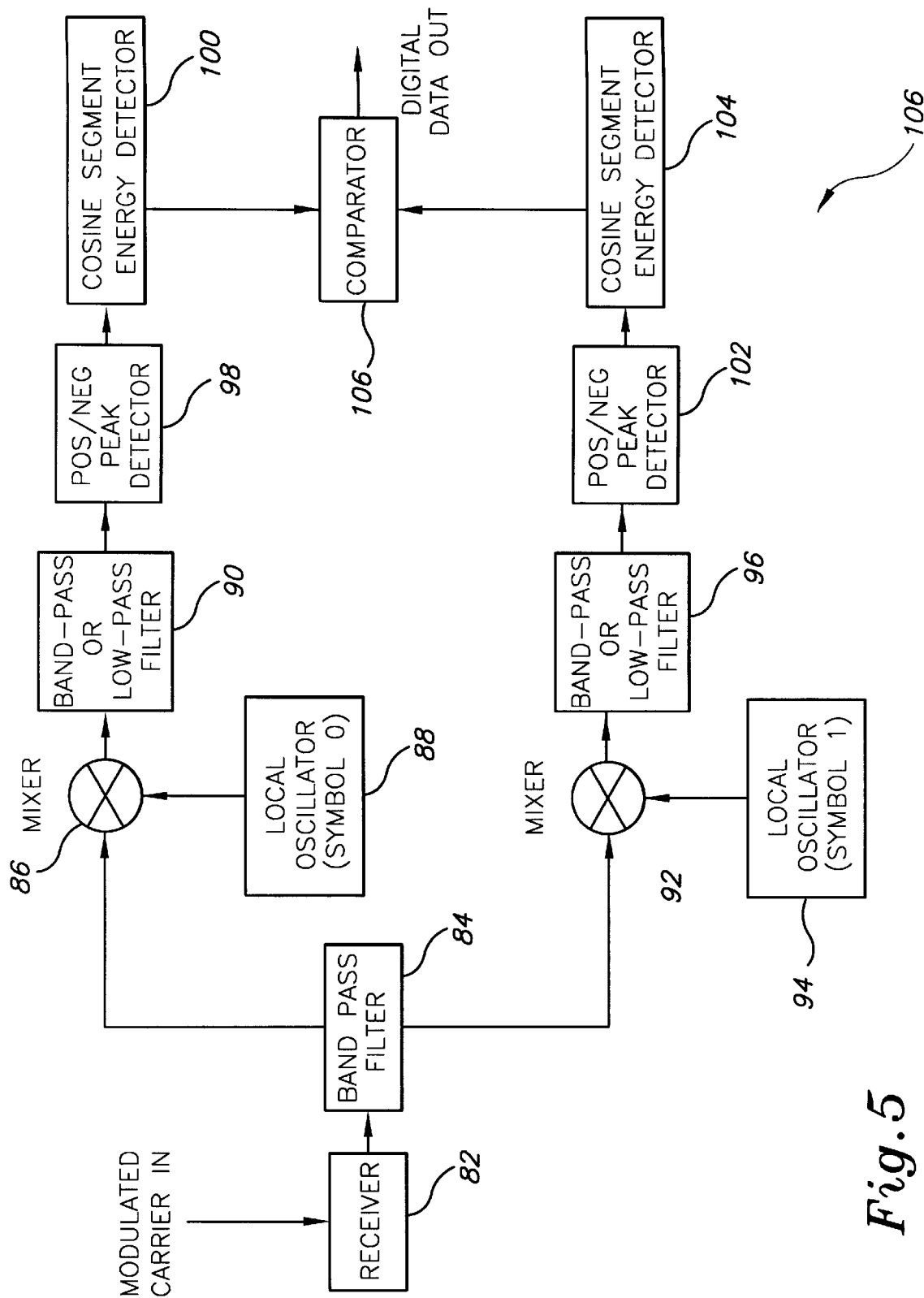
FIG. 5 is a block diagram of a demodulator circuit for use with data which has been modulated with multiple cosine segments.
Figure 7:
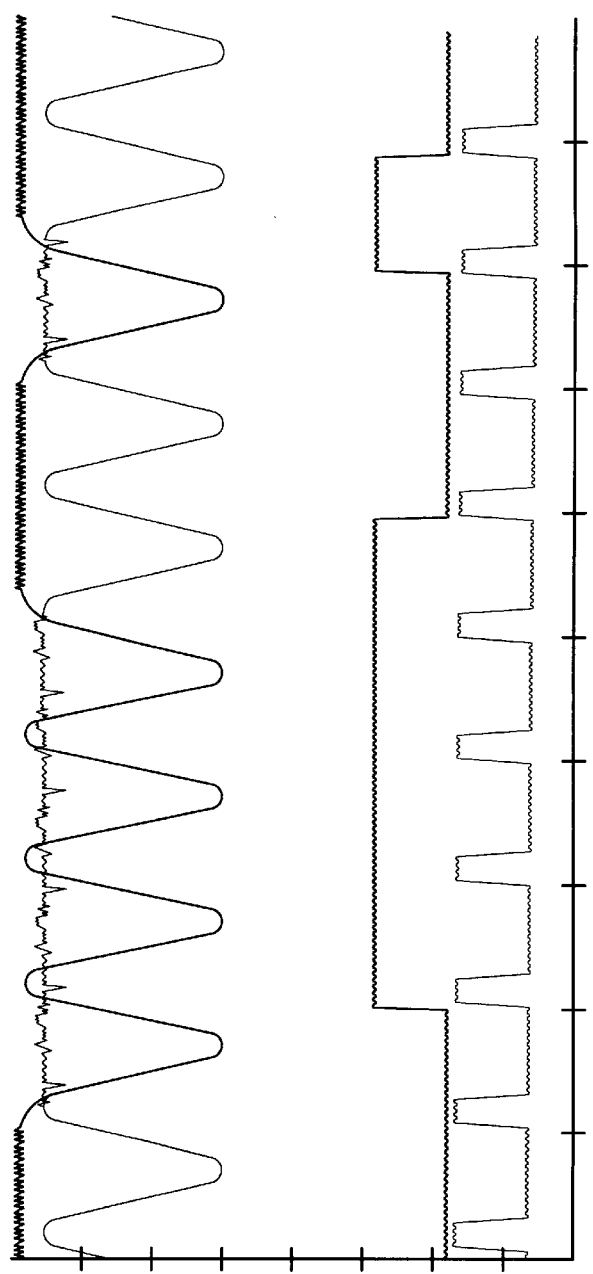
FIG. 7 is a plot of the filtered output of the mixers from FIG. 5.

FIG. 5 illustrates an alternative embodiment of a block diagram of a demodulator circuit 80. A receiver 82 receives the digitally modulated carrier signal and directs it to a bandpass filter 84 in order to remove noise and interference which is outside of the bandwidth of the two carrier segments. The bandpass filter 84 includes two outputs for directing the resulting signal to first and second mixer 86, 92. A first and second local oscillator 88, 94 are respectively coupled to the first and second mixers 86, 92. The first mixer 86 is used to downconvert one of the symbol frequencies to the lowest possible value by producing the sum and difference frequencies. Thus, carrier segments having the same frequency as the first local oscillator 88 will have a beat frequency of 0 Hz. The second mixer 92 is used to downconvert the other symbol frequency to the lowest possible value by producing the sum and difference frequencies. Thus, carrier segments having the same frequency as the second local oscillator 94 will have a beat frequency of 0 Hz. The output of the first mixer 86 is filtered and directed to a first peak detector 98. The output of the first peak detector 98 is subsequently directed to a first cosine segment energy detector 100. The output of the second mixer 92 is filtered and directed to a second peak detector 102. The output of the second peak detector 102 is subsequently directed to a second cosine segment energy detector 104. The filtered outputs of the two mixers are illustrated in FIG. 7. A comparator circuit 106 receives the signals from the first and second cosine segment energy detectors 100, 104 and recovers the base band digital data based upon which detector produces the most energy. Turning again to FIG. 7, it is seen that the filtered output of the first mixer 86 will contain a zero slope segment having a minimum kinetic energy value when the incoming carrier frequency of symbol 0 matches the frequency of the first local oscillator 88. The output of the second mixer 92, on the other hand, contains a complete cosine cycle during the same symbol time since the second local oscillator's 94 frequency cannot match the frequency of the incoming modulated carrier. The cosine cycle produced by the second mixer 92 has a kinetic energy value which is maximized based upon the relative kinetic energies of the input carrier signal and the second local oscillator 94. The process is reversed for symbol 1.

Figure 8:
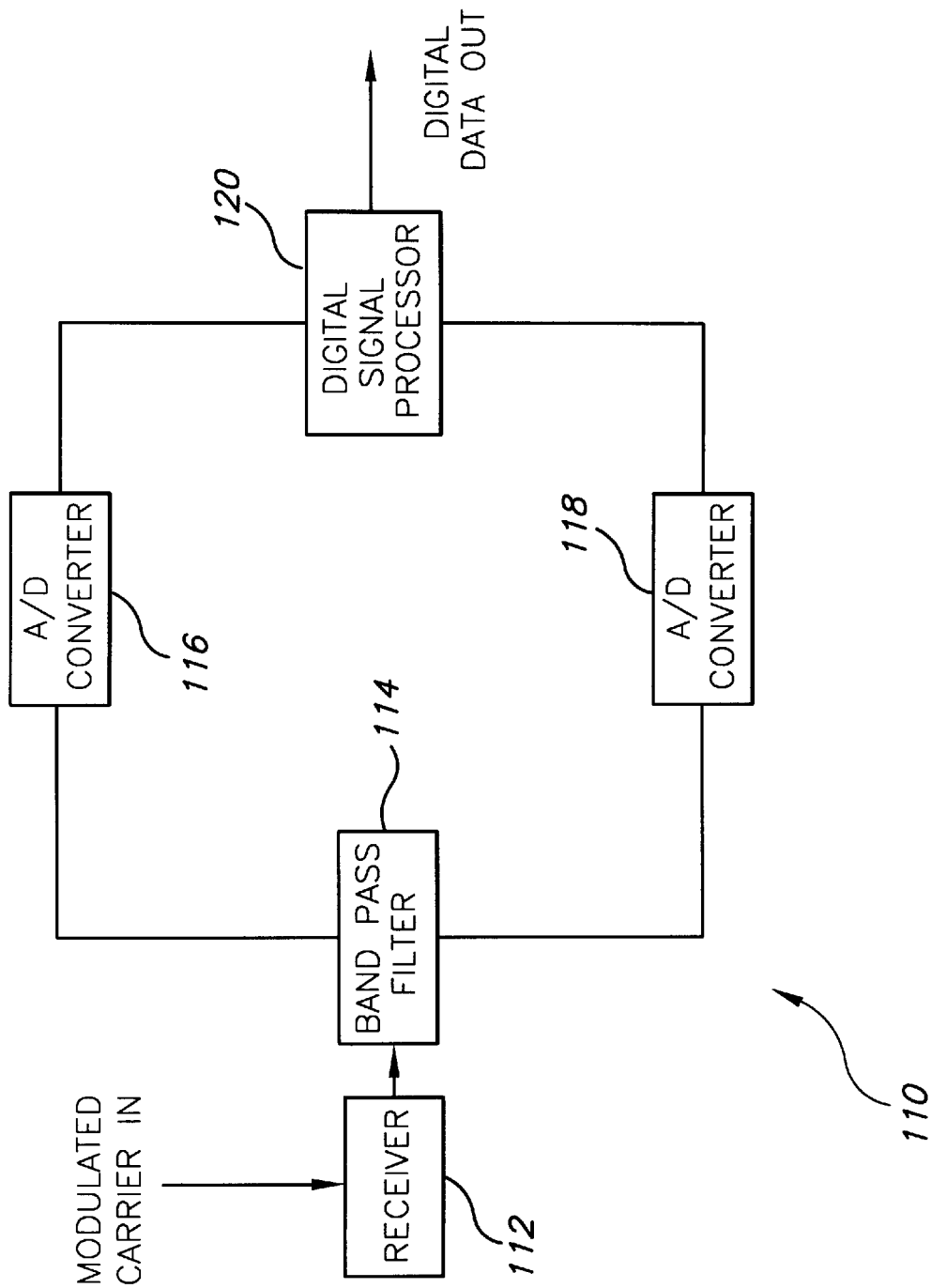
FIG. 8 is a block diagram of an alternative demodulator circuit.

FIG. 8 illustrates a block diagram of an alternative demodulating circuit 110. A receiver 112 receives the digitally modulated carrier signal and directs it to a bandpass filter 114 in order to remove noise and interference which is outside of the bandwidth of the two carrier segments. The bandpass filter 114 includes two outputs which direct the resulting signal to a first and second A/D converter 116, 118. The first A/D converter 116 samples at a rate which is related to the frequency of symbol 0. The second A/D converter 118 samples at a rate which is related to the frequency of symbol 1. The outputs of the first and second A/D converters are directed to a digital signal processor 120 which detects the cosine segment energy. This eliminates the use of a local oscillators, band pass filters, and peak detectors which would otherwise be necessary for each of the two symbols.

Figure 9:
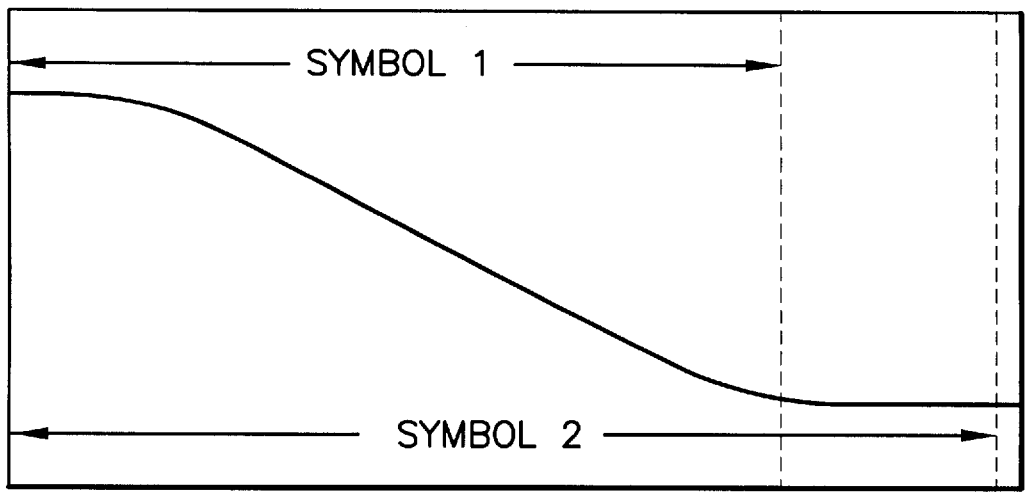
FIG. 9 illustrates two unique symbols capable of being used in cosine segment modulation.
Figure 10:
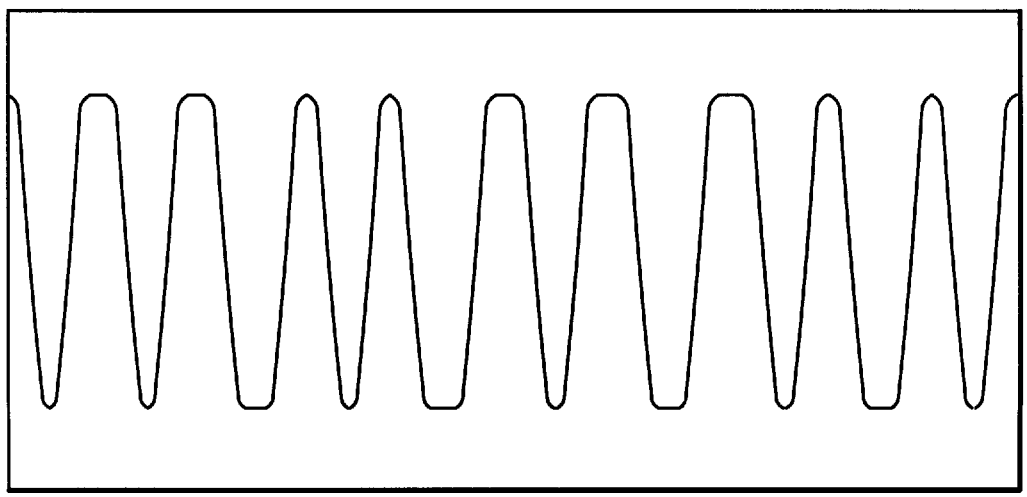
FIG. 10 is a diagram of data modulated using the symbols illustrated in FIG. 9.

FIGS. 9 and 10 illustrate another method of encoding two symbols using time-shifted cosine segments to represent digital data. The coding for symbol one is represented as a cosine segment while the coding for symbol two is represented as the same cosine segment with an additional zero slope segment added to it. When these symbols are added together in a phase continuous manner, a carrier signal is produced which looks very much like a pure sine wave. This carrier signal is illustrated in FIG. 10. This type of encoding has significant advantages over conventional encoding techniques. Since the digital symbols produced by Time-Shifted Cosine Segment modulation do not contain vertical edges that must be carefully filtered, the resulting carrier only requires a very narrow bandwidth since the symbol bit edges transition so smoothly.

Figure 11A:
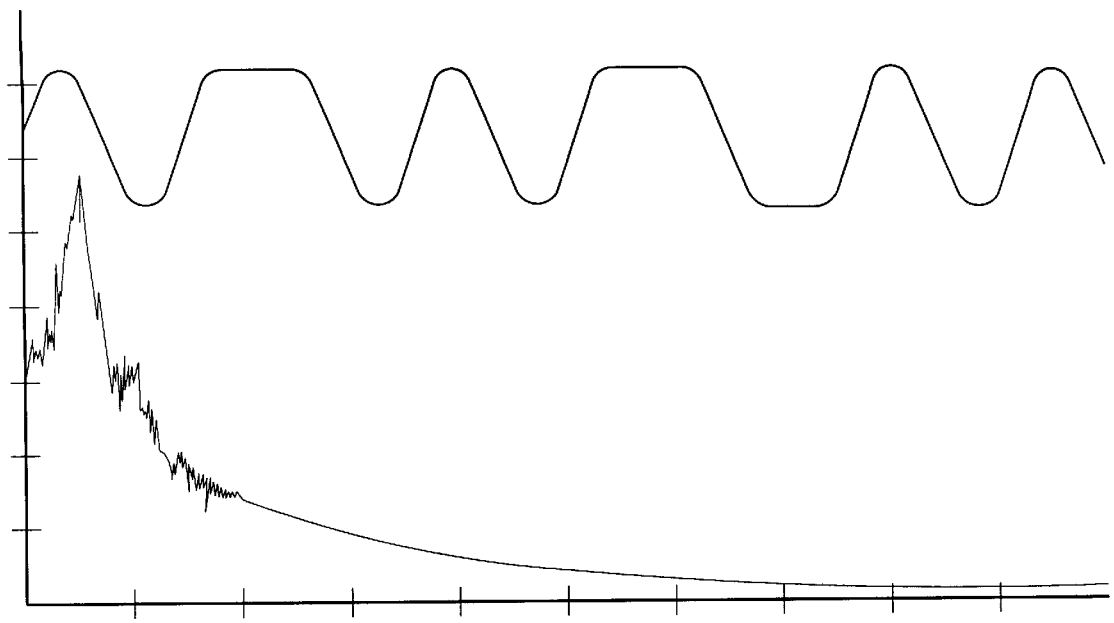
FIGS. 11A–11B are a frequency plot of the same data modulated with cosine segment modulation.
Figure 11B:
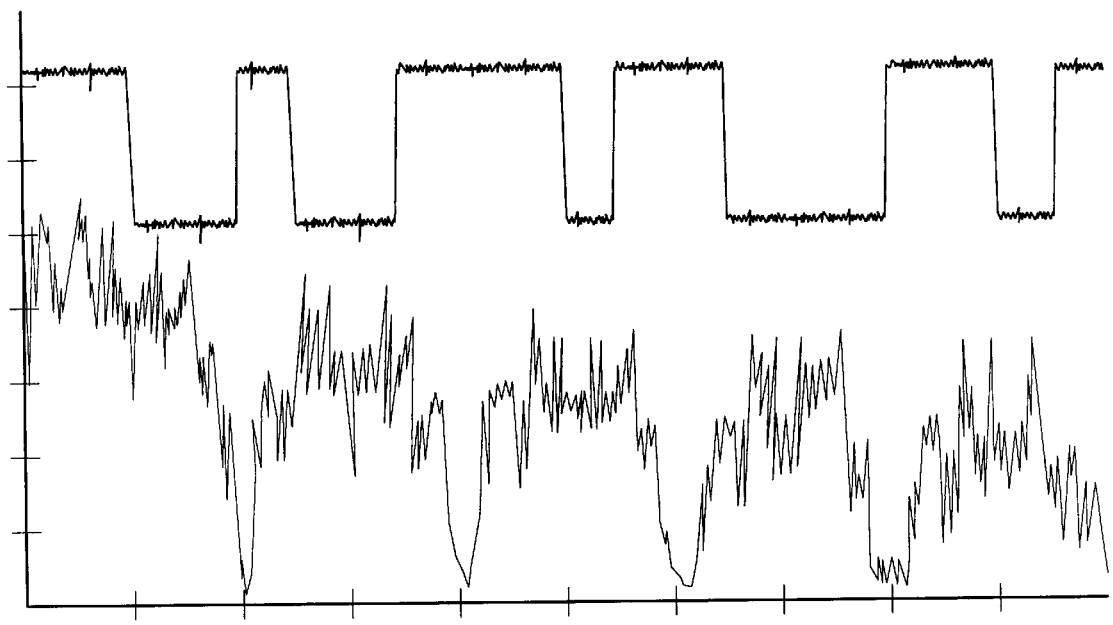

FIGS. 11A–11B are plots of the frequency spectrums of the data shown in FIG. 10 modulated using time-shifted cosine segment modulation and NRZ modulation. Examination of two frequency spectrum plots quickly reveals that NRZ modulation requires energy components from DC to the 1/T frequency as a minimum and filtering must be used to suppress energy components at frequencies above this point. On the other hand, Time-Shifted Cosine Segment modulation has most of its energy at half the frequency of the 1/T point and energy components drop off very rapidly on both sides of this frequency peak without the use of filtering. This means there are no DC components in the spectrum and no negative frequencies which become apparent when this base band modulation is translated up in frequency.

Figure 12:
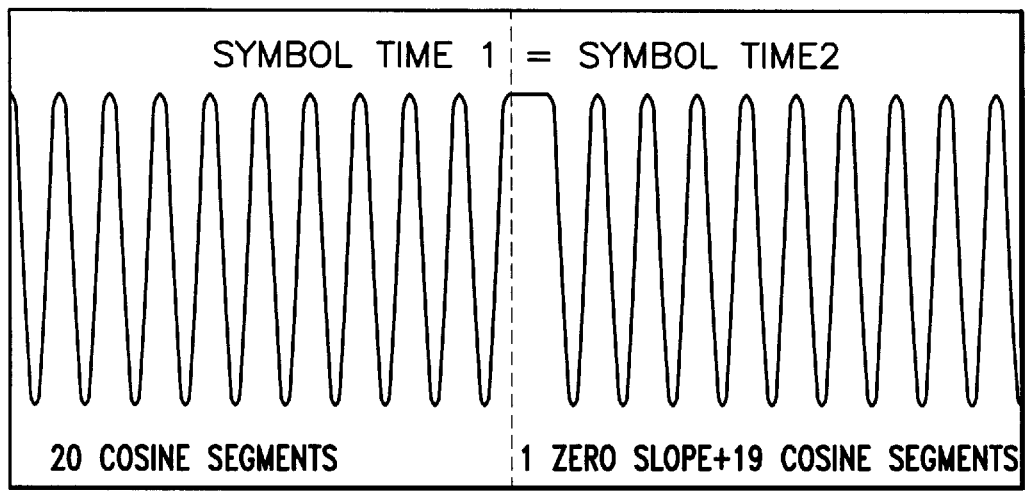
FIG. 12 is a diagram of phase-shift keyed data modulated using cosine segment modulation.
Figure 13:
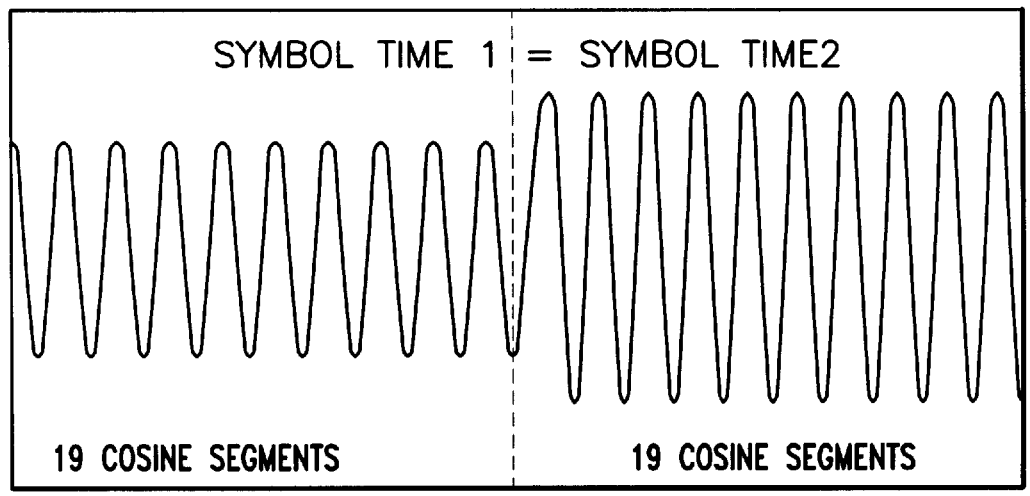
FIG. 13 is a diagram of amplitude-shift keyed data modulated using cosine segment modulation.

FIGS. 12 and 13 respectively illustrate the manner in which phase shifting and amplitude shifting would be accomplished using multiple cosine segment modulation. Phase-shifting is accomplished by having one cosine segment out of twenty replaced by a zero slope segment in one of the symbols while the other symbol contains twenty equal cosine segments within the same symbol time. All symbol transitions again occur at zero slope points of the cosine segments. Amplitude-shifting is accomplished by having one cosine segment of intermediate amplitude transition between symbols of equal phase and frequency, but different amplitudes. All symbol transitions again occur at zero slope points of the cosine segments. It is possible to create unique symbols comprised of both phase and amplitude variations by adding cosine segments of different amplitudes and zero slope segments together.

Figure 14:
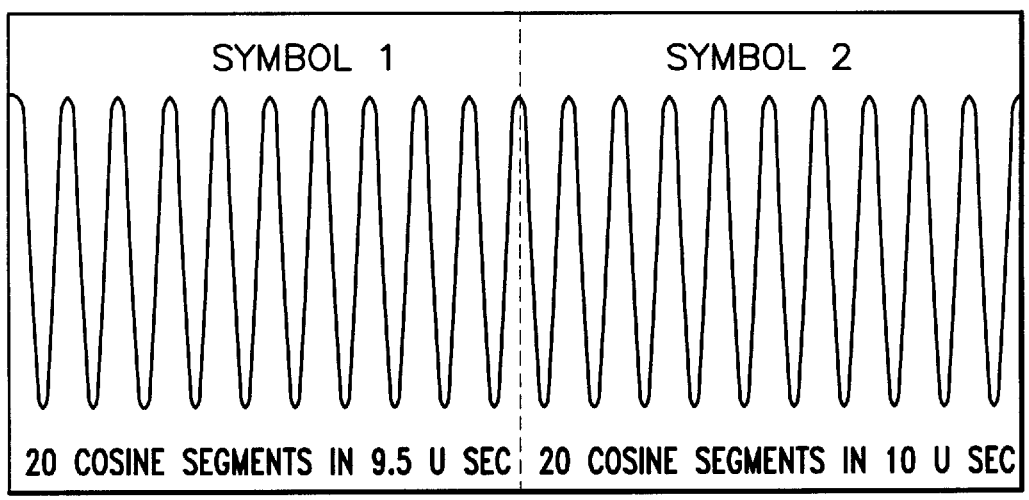
FIG. 14 is a diagram of time-shift keyed data modulated using cosine segment modulation.

It is also possible to use multiple cosine segments to create unique symbols at higher carrier frequencies using Multiple Cosine Segment Modulation, as illustrated in FIG. 14. Each cosine segment is 1 pi radians from zero slope to zero slope and all symbol transitions occur at a zero slope point. Each symbol contains 20 cosine segments, however, the time periods for the two symbols are different. This technique can sometimes eliminate the frequency upconversion process that requires a local oscillator and mixer. Another benefit of multiple cosine segment modulation is its constant amplitude envelope that has a very narrow bandwidth without filtering.

Figure 15A:
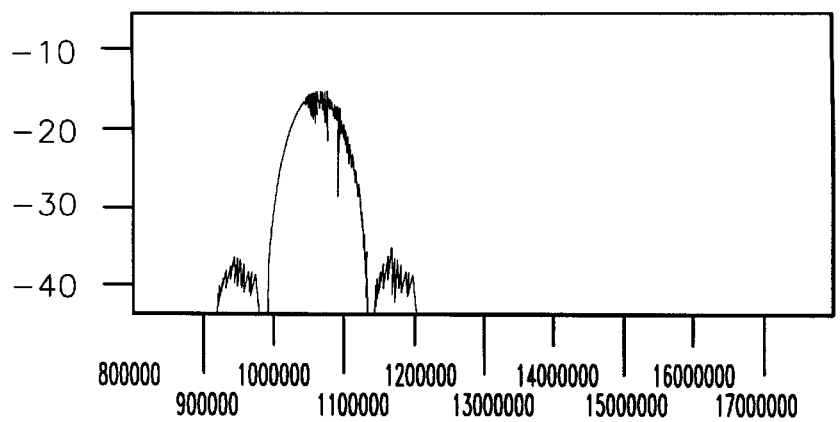
FIG. 15A is a frequency plot of the data shown in FIG. 12.
Figure 15B:
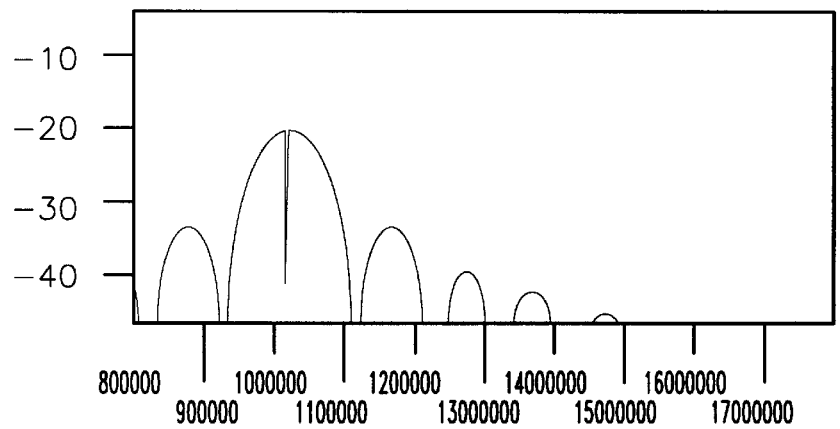
FIG. 15B is a frequency plot using traditional phase-shift keyed data without filtering.
Figure 15C:
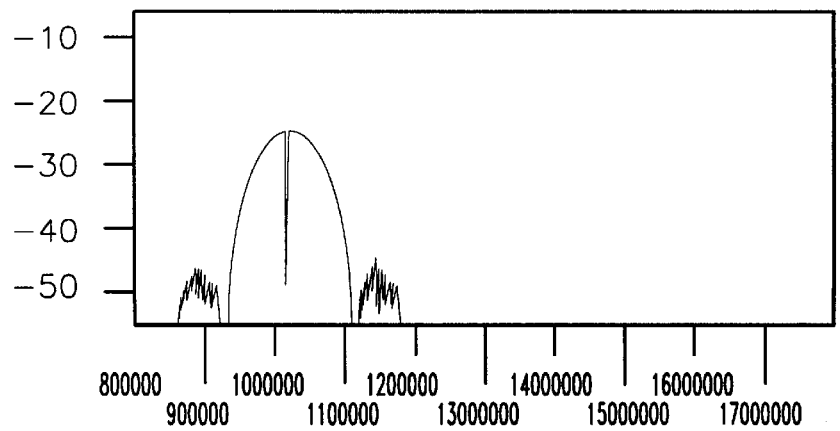
FIG. 15C is a frequency plot using traditional phase-shift keyed data in conjunction with a filter.

FIGS. 15A–15C comparatively illustrate the frequency plots of this data using multiple cosine segment modulation and conventional phase-shift keyed modulation. As seen in FIG. 15A, the multiple cosine segment modulation has a bandwidth which is essentially composed of the primary null to null energy lobe. Accordingly, there is only a minimal need for filtering. FIG. 15B however, illustrates the increased bandwidth created outside the primary lobe That occurs with conventional phase-shift keyed modulation, thus requiring the use of filters. FIG. 15C illustrates the resulting phase-shift keyed modulated bandwidth after filtering. Comparison of FIGS. 15A and 15C quickly reveals that multiple cosine segment modulation creates a more desirable bandwidth than the filtered phase-shift keyed modulated data.

Figure 16:
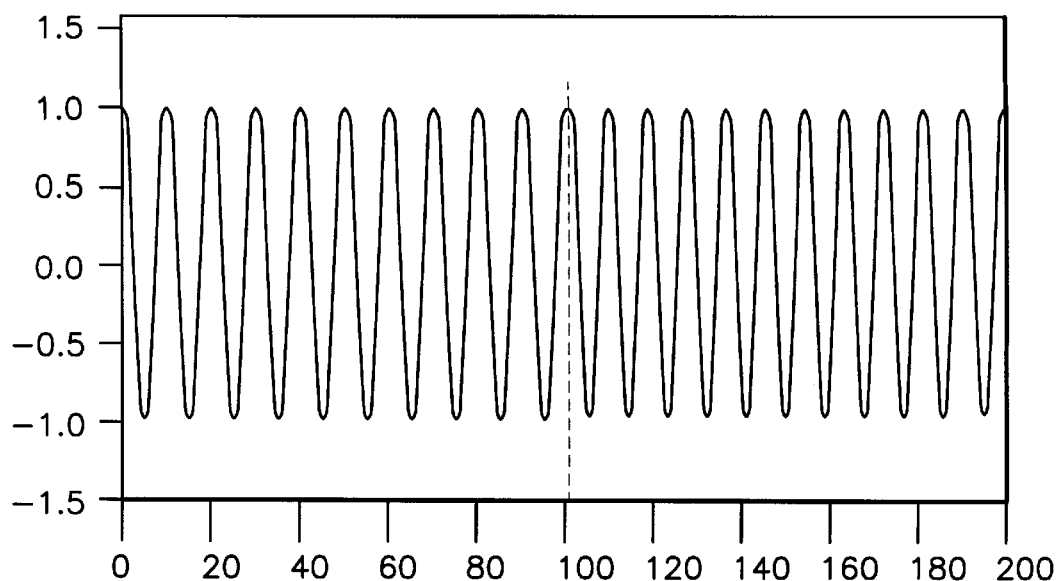
FIG. 16 is a diagram of cosine segment modulated data with a one cycle difference between the symbols.
Figure 17:
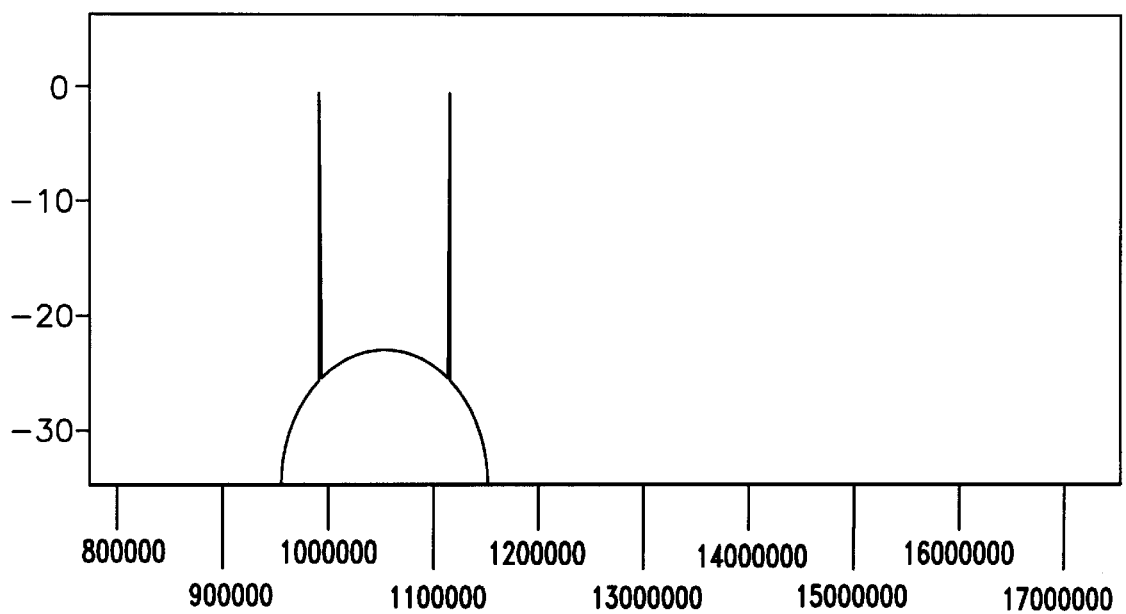
FIG. 17 is the frequency plot of the data illustrated in FIG. 16.
Figure 18:
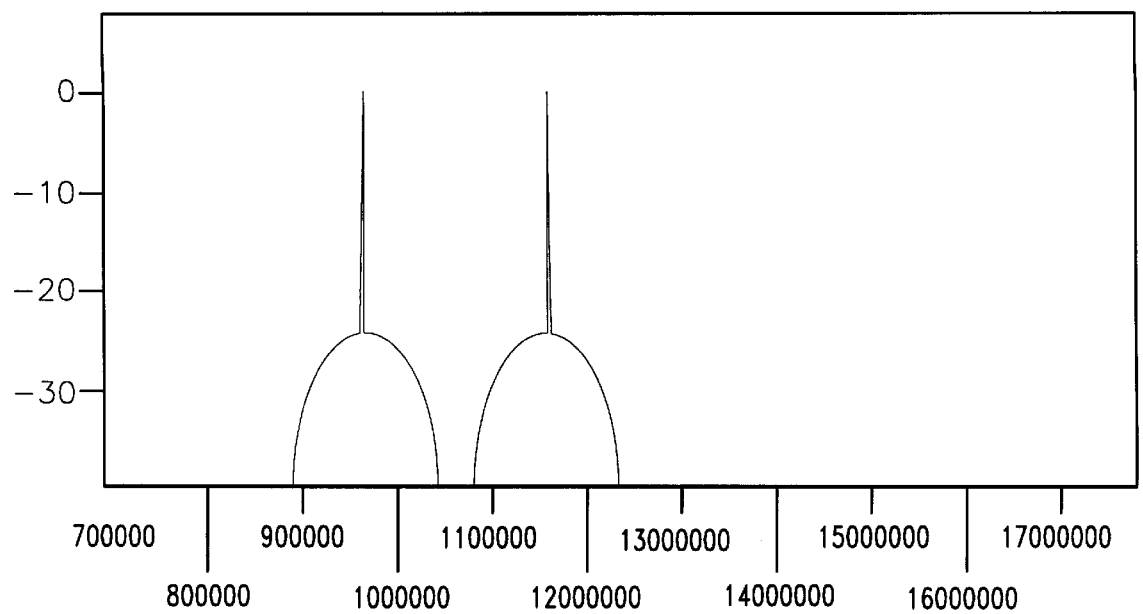
FIG. 18 is the frequency plot of cosine segment modulated data with a two cycle difference between the symbols.
Figure 19:
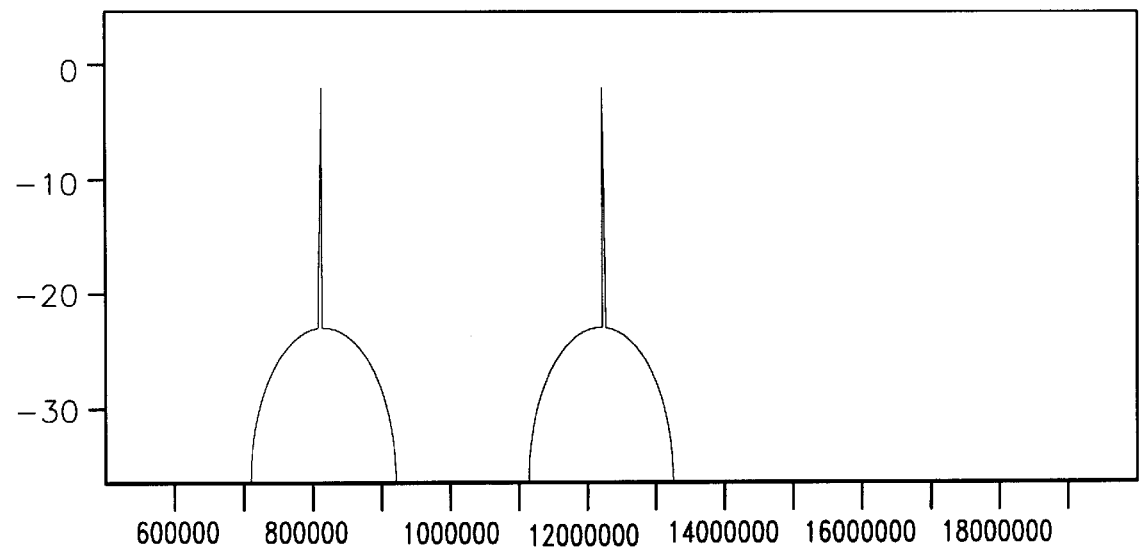
FIG. 19 is the frequency plot of cosine segment modulated data with a four cycle difference between the symbols.
Figure 20:
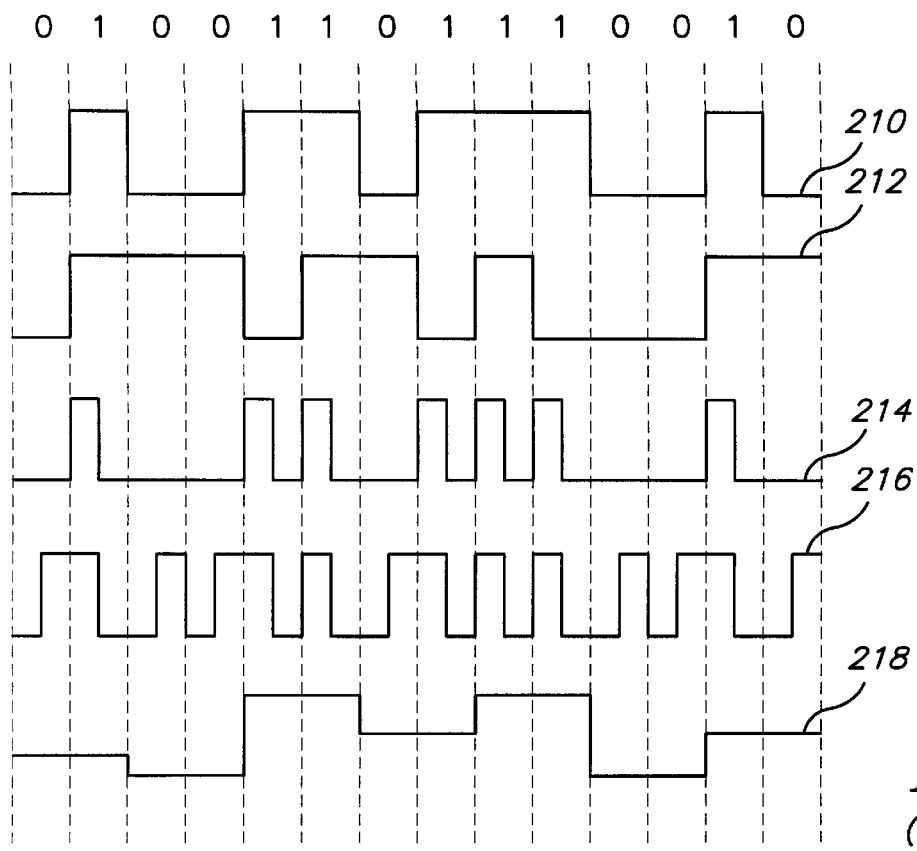
FIG. 20 illustrates various digital encoding techniques used by the prior art.
Figure 21:
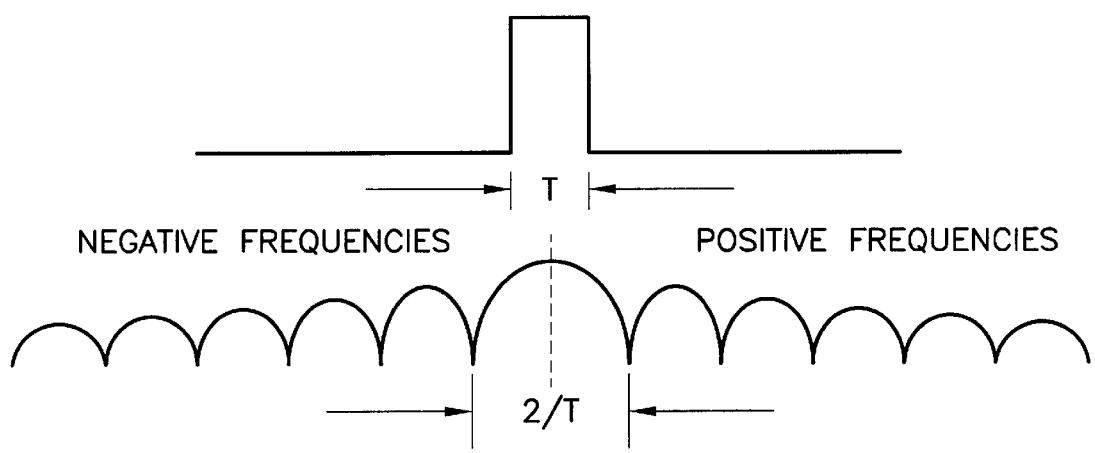
FIG. 21 illustrates a rectangular pulse and its associated bandwidth as known in the prior art.

It is further possible to use multiple cosine segments to create unique symbols at higher carrier frequencies using Multiple Cosine Segment Modulation with equal bit times, as illustrated in FIG. 16. Each cosine segment is 1 pi radians from zero slope to zero slope and all symbol transitions occur at a zero slope point. Symbol one contains 20 cosine segments, while symbol two contains 22 cosine segments. Since the bit times are equal, this represents one complete cosine cycle difference between the two symbols. FIG. 17 illustrates the resulting plot of the frequency spectrum. The main null to null energy lobe contains two energy spikes which are exactly 100 KHz apart, i.e. the cosine cycle difference between the two symbols multiplied by the bit rate. Furthermore, the two energy spikes contain 99% of the spectrum energy. The remainder of the energy lobe only represents 1% or less of the spectrum energy. If the two symbols are more than one cycle apart, then two primary null to null energy lobes are created, one for each symbol. This case is illustrated in FIGS. 18 and 19, which are representative of a two and four cycle difference, respectively. As the difference in cycles between the two symbols increases, the main null to null energy lobes drift further apart. The distance between the resulting energy spikes would be 200 KHz, and 400 KHz, respectively. This results from two cosine cycles and four cosine cycles being multiplied by the bit rate, respectively. However, each null to null energy lobe retains a single energy spike which contains nearly 50% of the spectrum energy.

As seen by intuitive examination of FIGS. 18 and 19, CSM may also be used in frequency hopping or spread spectrum applications. This is based on the ability to transition to new carrier frequencies instantaneously without producing spurious output outside of the symbol frequencies without the need for settling time. This allows transmission under noisy conditions by changing carrier frequencies in a predetermined manner with the receiver. Furthermore a more secure communication link can be achieved by constant cycling or changing of carrier frequencies.

It is to be understood that the present invention is not limited to the sole embodiment described above, but encompasses any and all embodiments within the scope of the following claims.

I claim:

1. A method of digital cosine segment demodulation comprising the steps:

receiving digital cosine segment modulated data comprising a plurality of carrier segments, wherein each of the carrier segments begins and ends with zero slope edges and is selected from the group consisting of a cosine segment, a zero slope level segment, and combinations thereof;

filtering the digital cosine segment modulated data in order to remove unwanted noise and interference; and recovering the plurality of carrier segments of the digital cosine segment modulated data, wherein said step of recovering further comprises the steps:

downconverting the frequency of each of the plurality of carrier segments to the lowest possible value;

filtering the resulting signal downconverted frequency of each of the plurality of carrier segments; and detecting each of the plurality of carrier segments, wherein said step of downconverting further includes the steps:

setting a local oscillator having an output to the same frequency as one of the plurality of carrier segments;

mixing the output of the local oscillator with the filtered cosine segment modulated signal downconverted frequency of each of the plurality of carrier segments in a mixer having an output;

filtering the output of the mixer to produce cosine segment-mark encoded data containing cosine segments and or zero slope segments or a combination of both; and determining the presence of a cosine segment during the a predetermined symbol duration.

2. A method of digital demodulation as recited in claim 1 wherein said step of recovering is performed by detecting the presence of a cosine segment within a predetermined bit time.

3. A method of digital demodulation as recited in claim 1 wherein said step of recovering is performed by detecting the presence of a cosine segment within a predetermined symbol duration.

4. A cosine segment communication system comprising:

means for sequentially receiving a plurality of digital data blocks, each of said digital data blocks having a predetermined discrete value associated therewith, said predetermined discrete value being chosen from a predetermined number of possibly assigned discrete values;

means for modulating said plurality of digital data blocks in order to construct a carrier signal having a plurality of carrier segments representing a predetermined set of shapes, each of said shapes beginning and ending with zero slope edges and being selected from the group consisting of a cosine segment, a zero slope level segment, and combinations thereof, and said means for modulating further including an input and an output;

means for determining completion of each of the plurality of carrier segments of the carrier signal constructed by said means for modulating, said means for determining being coupled to the output of said means for modulating; and a controller for producing a control signal indicative of a predetermined shape to be selected in accordance with a predetermined discrete value associated with said plurality of digital data blocks, said controller further including:

a first input coupled to said means for sequentially receiving;

a second input coupled to said means for determining;

an output coupled to the input of said means for modulating;

means for transmitting said carrier signal to a remote destination;

means for remotely receiving said carrier signal; and means for demodulating said carrier signal;

wherein said means for demodulating includes:

a first filter for removing unwanted noise and interference from the carrier signal transmitted to said means for receiving;

a first oscillator having a predetermined frequency corresponding to a frequency of one of said carrier segments;

a mixer having a first and second input for respectfully mixing signals from said first filter and said first oscillator, and an output for directing a resultant signal;

a second filter coupled to the output of said mixer for removing unwanted noise and interference from the resultant signal; and means for recovering a carrier segment from said resultant signal.

5. A cosine segment communication system as recited in claim 4 wherein said predetermined number of possibly assigned discrete values is two.

6. A cosine segment communication system as recited in claim 4 wherein said means for modulating further comprises:

a phase accumulator coupled to the output of said controller for receiving said control signal and generating a succession of phase address locations in accordance with said control signal; and a ROM look-up table having cosine segment coefficients stored therein in a successive manner corresponding to said phase address locations, thereby producing a succession of cosine segment coefficients.

7. A cosine segment communication system as recited in claim 6 wherein said means for modulating further includes:

a digital to analog converter coupled to said ROM look-up table, said digital to analog converter being capable of converting said succession of cosine segment coefficients into analog signals; and a filter capable of receiving said analog signals from said digital to analog converter and producing a low distortion sinusoidal waveform.

8. A cosine segment communication system as recited in claim 4 wherein said means for recovering comprises a zero crossing detector.

9. A cosine segment communication system as recited in claim 4 wherein each carrier segment is a cosine segment having a length of pi radians.

10. A cosine segment communication system as recited in claim 4 wherein said first filter includes a predetermined number of outputs corresponding to said predetermined number of discrete values and said means for modulating further comprises:

a second oscillator having a predetermined frequency corresponding to the frequency of another one of said segments;

a second mixer having a first and second input for respectively receiving the signals from said first filter and said second oscillator, and an output for directing the resultant signal;

a third filter coupled to the output of said second oscillator for removing noise from the resultant signal;

a first peak detector coupled to the output of said second filter;

a second peak detector coupled to the output of said third filter;

a first cosine segment energy detector coupled to the output of said first peak detector;

a second cosine segment energy detector coupled to the output of said second peak detector; and a comparator having two inputs and an output, each of said inputs being respectively coupled to said first and second cosine segment energy detectors.

11. A cosine segment communication system as recited in claim 10 wherein said peak detection means includes:

an operational amplifier having its inverted input coupled to said filter; and a delay circuit having an input coupled to said filter, and an output coupled to the normal input of said operational amplifier.

* * * * *